United States Patent [19]

Gregory

[11] Patent Number: 4,826,400
[45] Date of Patent: May 2, 1989

[54] CURVILINEAR TURBINE AIRFOIL

[75] Inventor: Brent A. Gregory, Cincinnati, Ohio

[73] Assignee: General Electric Company, Cincinnati, Ohio

[21] Appl. No.: 947,457

[22] Filed: Dec. 29, 1986

[51] Int. Cl.$^4$ ............................................. F01D 1/10
[52] U.S. Cl. ...................................... 415/181; 415/914
[58] Field of Search ................... 416/189 R, 195, 228, 416/223 A, DIG. 2; 415/181, DIG. 1, 208, 216, 217

[56] References Cited

U.S. PATENT DOCUMENTS

| | | | |
|---|---|---|---|
| 327,370 | 9/1885 | Williams | 416/223 |
| 984,812 | 2/1911 | Hearst | 416/189 R |
| 1,062,258 | 5/1913 | Schlotter | 415/119 |
| 2,110,679 | 3/1938 | Robinson | 416/189 |
| 2,962,260 | 12/1954 | Foley | 253/78 |
| 3,745,629 | 7/1973 | Pask et al. | 415/119 |
| 3,883,264 | 5/1975 | Rao | 416/189 |
| 3,989,406 | 11/1976 | Bliss | 416/228 |
| 4,131,387 | 12/1978 | Kazin et al. | 415/119 |
| 4,358,245 | 11/1982 | Gray | 415/DIG. 1 |
| 4,459,087 | 7/1984 | Barge | 416/189 R |
| 4,470,755 | 9/1984 | Bessay | 415/191 |

FOREIGN PATENT DOCUMENTS

| | | | |
|---|---|---|---|
| 2739885 | 3/1978 | Fed. Rep. of Germany | 416/223 A |
| 123095 | 10/1927 | Switzerland | 416/195 |
| 27409 | of 1907 | United Kingdom | 415/119 |
| 409322 | 4/1934 | United Kingdom | 415/119 |
| 478104 | 1/1938 | United Kingdom . | |
| 712589 | 7/1954 | United Kingdom | 416/223 A |
| 1099360 | 1/1968 | United Kingdom . | |
| 1116580 | 6/1968 | United Kingdom . | |
| 2166808 | 5/1986 | United Kingdom . | |

OTHER PUBLICATIONS

Investigation and Calculation of Axial-Turbine Stages, cover sheet plus pp. 342 and 343, M. Ye. Deych et al., dated 4/18/67.

Primary Examiner—Robert E. Garrett
Assistant Examiner—John T. Kwon
Attorney, Agent, or Firm—Steven J. Rosen; Derek P. Lawrence

[57] ABSTRACT

A turbomachinary airfoil in one form comprises a pressure side and a suction side curved circumferentially outward in the direction that the suction side faces. The invention is effective for reducing both radial and circumferential boundary layer pressure gradients thereby reducing airfoil aerodynamic losses. In another form of the invention the airfoil is a vane of a turbine vane assembly having an inner and outer shroud wherein the vane in addition to being curved is leaned circumferentially outward in the direction that the suction side faces.

10 Claims, 3 Drawing Sheets

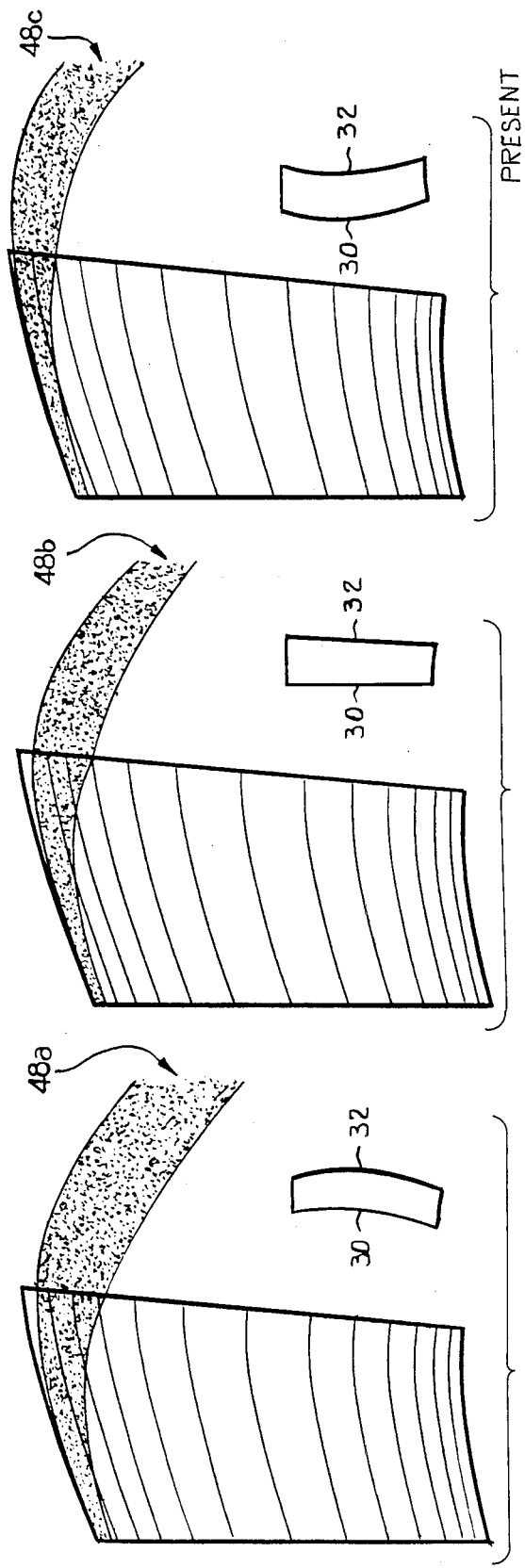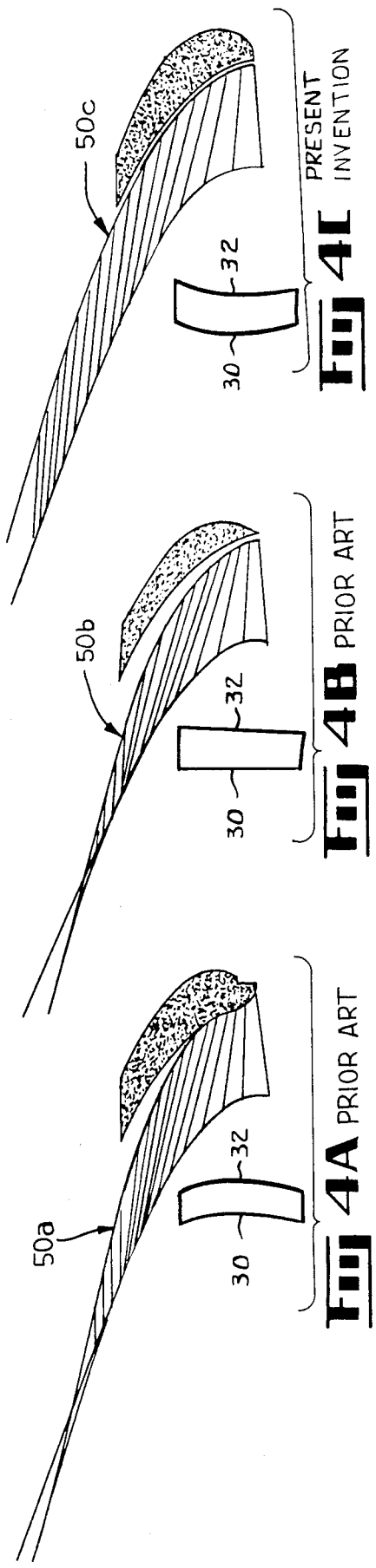

CURVILINEAR TURBINE AIRFOIL

FIELD OF THE INVENTION

This invention relates to an aircraft propulsion system and, more particularly, to a new and improved curvilinear airfoil effective for reducing both radial and circumferential boundary layer pressure gradients and hence the magnitude of secondary aerodynamic losses.

BACKGROUND OF THE INVENTION

Gas turbine engines generally include a compressor having rotor and stator stages for compressing air flowing through the engine, a combustor in which fuel is mixed with the compressed air and ignited to form a high energy gas stream, and a turbine which includes at least one rotor and stator stage for driving the compressor. The compressor generally comprises alternating rows of rotor blades attached to the rotor and stator blades, known as vanes, fixed with respect to the case. The compressor compresses the air that goes to the combustor where a portion is used to burn the fuel which in turn heats the remaining air and combustion products and flows it to the turbine. The turbine then extracts useful energy from the working fluid to power the compressor, accessories, and fan if applicable. The turbine generally comprises at least one alternating row of rotor blades attached to the rotor and stator blades, known as vanes, fixed with respect to the case. The turbine rotor blades are connected to the rotor and located aft of the combustor and within the gas flowpath so as to extract useful energy from the gas flow. In order to optimize the amount of energy extracted, arrays of vanes circumferentially positioned and radially mounted between inner and outer shrouds are interosed between the turbine blades. However, due to geometric characteristics of the vanes, large pressure gradients exist in the channels between the individual vanes. These gradients exist in the circumferential direction due to the blade surface velocity differential and in the radial direction with respect to the engine centerline due to flow vorticity. As a result of these large pressure gradients, higher pressure boundary air located along the inner surfaces of the vane endwalls, enters and disrupts the smooth aerodynamic mainstream airflow passing through the turbine. These disturbances can be large and create losses in proportion to the size of the pressure gradients that produce them.

In the past, various techniques have been proposed to overcome this problem. One such proposal was to lean the vanes in the circumferential direction. Another proposal was to flare the vanes circumferentially outward in the direction that the pressure or concave side of the vane faces. Yet another proposal was to curve the vanes so that the pressure or concave side of each vane would be turned towards the endwall casings thereby forming a "S" shaped curve. This "S" shaped curve results in a reduction in the circumferential pressure gradients thereby limiting the potential for low momentum, high pressure air to flow from the high pressure side of the channel towards the low pressure side and into the mainstream airflow. Although this curved vane is effective for reducing the circumferential pressure gradient, it significantly increases the pressure gradient in the radial direction.

OBJECTS OF THE INVENTION

A primary object of the present invention is to provide a new and improved airfoil for turbomachinary.

Another object of the present invention is to provide a new and improved turbine vane assembly for a gas turbine engine.

Yet another object of the present invention is to provide a new and improved vane with an improved airflow.

Yet another object of the present invention is to provide a new and improved vane with lower pressure gradients in the radial and circumferential directions.

A further object of the present invention is to provide a new and improved vane with lower performance losses attributable to boundary air leakage.

These and other objects of the invention, together with the features and advantages thereof, will become apparent from the following detailed specification when read in conjunction with the accompanying drawings in which applicable reference numerals have been carried forward.

SUMMARY OF THE INVENTION

The present invention is an airfoil for use in turbomachinary. The airfoil includes a pressure side and a suction side and is curved circumferentially outward in the direction that the suction side faces.

Another embodiment of the invention is a gas turbine engine vane assembly including inner and outer shrouds and an airfoil mounted between them. The airfoil is curved circumferentially outward in the direction that the suction side faces.

Yet a more particular embodiment of the invention is a turbine vane assembly including inner and outer shrouds and an airfoil mounted between. The airfoil is curved circumferentially outward and leaned in the direction that the suction side faces.

BRIEF DESCRIPTION OF THE DRAWINGS

The invention, together with further objects and advantages thereof, is more particularly described in the following detailed description taken in conjunction with the accompanying drawings in which:

FIGS. 3a, 3b, and 3c, respectively, are graphic presentations showing the suction side streamlines for a prior art vane which is curved circumferentially outward in the direction that the pressure side faces; a prior art vane which is not curved circumferentially at all; and a vane according to the present invention which is curved circumferentially outward in the direction that the suction side faces.

FIGS. 4a, 4b, and 4c, respectively, are diagrammatic radial presentations showing the outerwall casing streamlines for a prior art vane which is circumferentially curved outward in the direction that the pressure side faces; the prior art vane which is curved circumferentially outward in the direction that the pressure side faces; a prior art vane which is not curved circumferentially at all; and a vane according to the present invention which is curved circumferentially outward in the direction that the suction side faces.

DETAILED DESCRIPTION OF THE INVENTION

Figure 1:
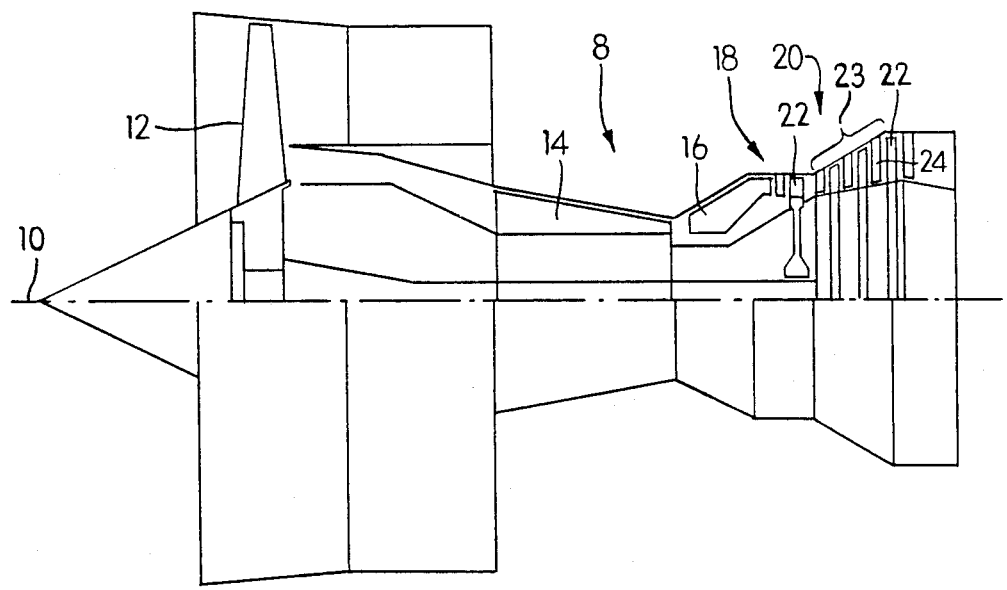
FIG. 1 is a diagrammatic cross section of a gas turbine engine having high and low pressure turbines.

FIG. 1 shows a gas turbine engine 8 circumscribing engine centerline 10 including fan 12, compressor 14, combustor 16, high pressure turbine 18, and low pressure turbine 20. Interposed between turbine blade rows 22 are turbine vane assemblies 23 including the airfoils which are more specifically referred to as turbine vanes 24.

Figure 2:
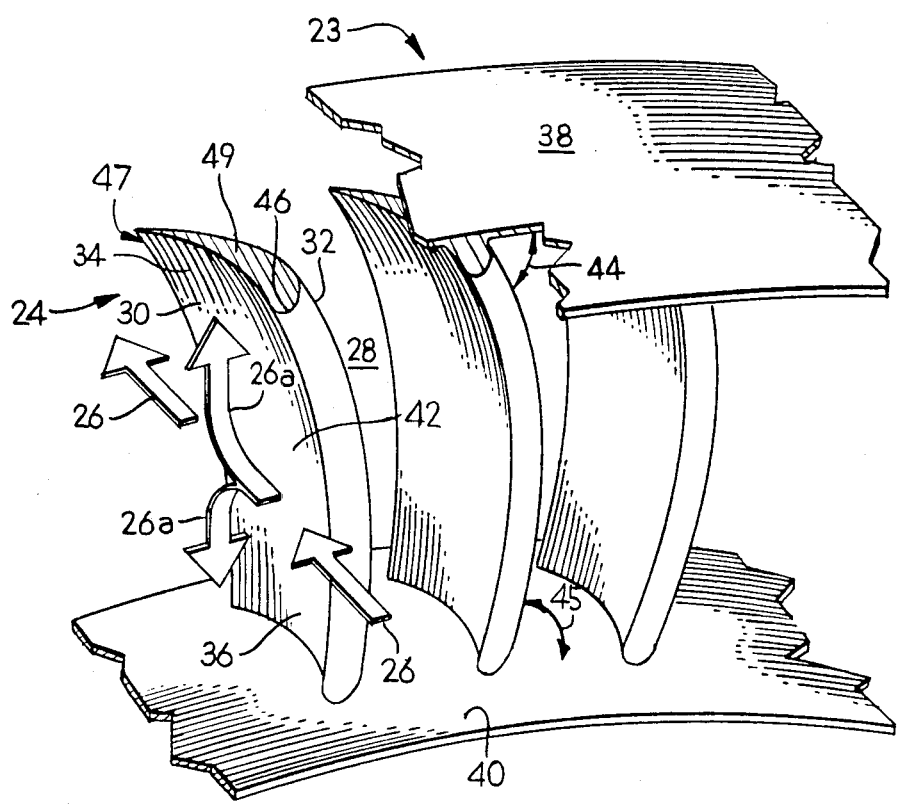
FIG. 2 is a partial view showing the turbine vane assembly of the present invention.

Illustrated in greater detail in FIG. 2 is the turbine vane assembly 23 including turbine vanes 24 separated by channel 28. According to one form of the present invention, each vane 24 includes a pressure side 30 and a suction side 32. In addition, each vane 24 has a radially outer end 34, a radially inner end 36, and a midspan 42. Each vane assembly assembly 23 further includes outer shroud 38 and inner shroud 40, the inside surfaces of which define the outer and inner boundaries of the flowpath through the turbine 20.

According to the present invention, the pressure gradients located in channel 28 can be favorably altered without substantially compromising the design of vanes 24 by curving said vanes circumferentially outward in the same direction that the suction side 32 is facing. The shape of the curved vane 24 is generally a continuous arc forming acute angles 44 and 45 with platforms 38 and 40, respectively. The effect of the curvature of the vane 24 is to direct a portion 26a of the mainstream airflow 26 in the radially inwardly and outwardly directions on the pressure side 30 of the vane. The vane 24 has a leading edge 46 and a trailing edge 47 which are important to the vane's operation as well as being useful in defining the aerodynamic shape of the vane.

FIGS. 3a, 3b, and 3c illustrate graphically the pressure gradients created in the radial direction by flow vorticity and located 1% from the vane leading edge 46 (FIG. 2) for two prior art vane configurations and that of the present invention. Also shown are sketches of the relative curvatures of the respective vanes as viewed from the rear of the vane assembly looking forward. FIGS. 3a, 3b, and 3c illustrate, respectively, a prior art airfoil which is curved circumferentially outward in the direction that the pressure side faces; a prior art which is not curved circumferentially at all; and an airfoil of the present invention which is curved circumferentially outward in the direction that the suction side faces hereinafter referred to as a first direction. Streamlines 48a, 48b, and 48c reflect the relative radial movement of the low momentum boundary layer airflow. As shown by streamlines 48c in FIG. 3c, vortex airflow generated by vane to vane pressure gradients, resulting from the present invention, is pulled down into the mainstream airflow to a significantly lesser extent than in the prior art designs.

FIGS. 4a, 4b, and 4c illustrate the prior art airfoil which is circumferentially curved outward in the direction that the pressure side faces; the prior art which is not circumferentially curved at all; and an airfoil of the present invention which is circumferentially curved outward in the direction that the suction side faces, respectively. Streamlines 50a, 50b, and 50c reflect the relative circumferential movement of the low momentum boundary layer airflow. As shown by streamlines 50c in FIG. 4c, the movement of this low momentum boundary layer airflow, resulting from the present invention, enters and disrupts the smooth aerodynamic mainstream airflow passing through the turbine to a significantly lesser extent than in the prior art designs.

The new vane which is curved circumferentially outward in the direction that the pressure side faces reduces the pressure gradient in both the radial direction and the circumferential direction (as shown in FIGS. 3c and 4c) over prior art designs. In this way, the potential for low momentum airflow to enter the mainstream airflow is reduced, thereby reducing the magnitude of secondary losses.

Figure 5:
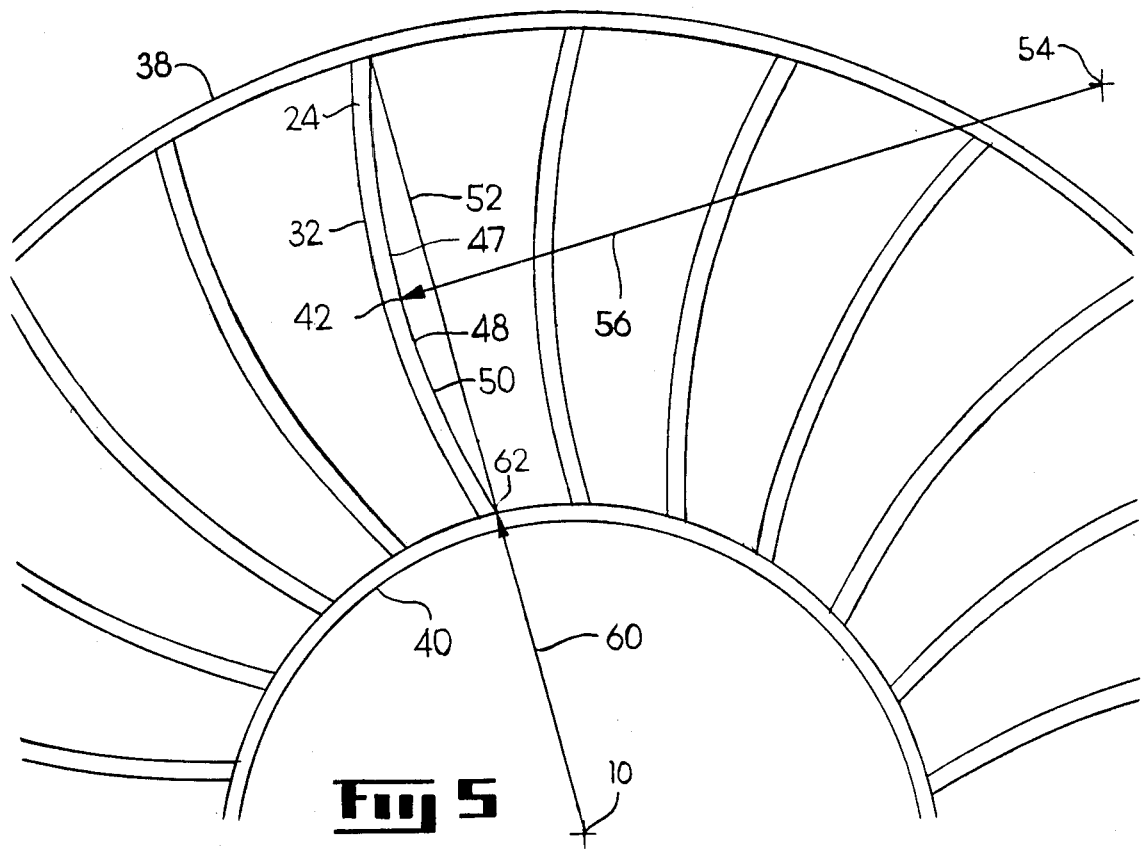
FIG. 5 is a diagrammatic, partially cross section view showing the turbine vane assembly from the rear and more particularly the turbine vane having a curved stacking line.
Figure 6:
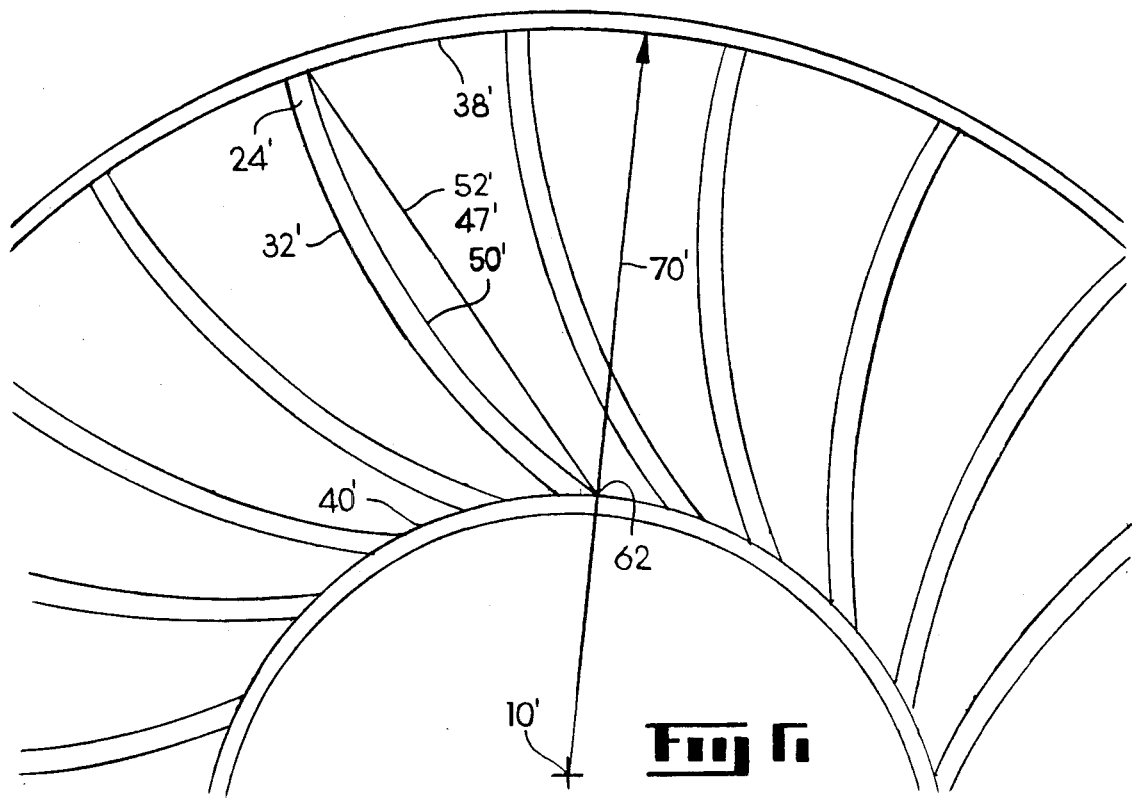
FIG. 6 is a diagrammatic, partially cross section view showing an alternative embodiment of the turbine vane assembly from the rear and more particularly the turbine vane having a curved stacking line which is also leaned.

The circumferential curvature of a blade such as the turbine vane 24 is defined by shape of the stacking line 50 in FIG. 5. In the preferred embodiment the stacking line 50 coincides with the trailing edge 47 in FIG. 2. The stacking line is a design parameter about which the airfoil cross sections 49 are drawn or oriented. In FIG. 2 the vane 24 is shown as having a constant cross section through the length of the vane. One form of the invention as shown in FIG. 5 has an arc shaped stacking line 50 defined by an arc radius 56 and an origin 54 such that a radius 56 drawn to the midspan 42 bisects the chord 52 of the arc shaped stacking line 50. In this form the vane 24 is curved but not leaned so that the chord 52 is colinear with a first engine radius 60 drawn from the engine centerline 10 through the point of intersection 62 between stacking line 50 and inner shroud 40. In yet another form of the invention shown in FIG. 6 the vane 24' is leaned in the direction that the suction side 32' faces. The cord 52' of the arc shaped stacking line 50' is not colinear with a second engine radius 70'. The second engine radius 70' is drawn from the engine centerline 10' through the point of intersection 62' between stacking line 50' and inner shroud 40' to outer shroud 38' thereby forming an acute angle $\xi$ with the second engine radius 70'.

It will be clear to those skilled in the art that the present invention is not limited to the specific embodiments described and illustrated herein.

It will be understood that the dimensions and proportional and structural relationships found in the drawings are illustrated by way of example only and these illustrations are not to be taken as the actual dimensions or proportional structural relationships used in the vanes of the present invention.

Numerous modifications, variations, and full and partial equivalents can be undertaken without departing from the invention as limited only by the spirit and scope of the appended claims.

What is desired to be secured by Letters Patent of the United States if the invention as recited in the following claims.

I claim:

1. A turbine vane comprising a pressure side and a suction side, wherein said airfoil is curved circumferentially outward in a first direction, said first direction being the direction which said suction side faces.

2. The turbine vane of claim 1 wherein said turbine vane is also leaned in said first direction.

3. A turbine vane comprising a pressure side, a suction side, and a stacking line for defining the profile of said airfoil, wherein said stacking line is curved circumferentially outward in a first direction, said first direction being the direction which said suction side faces.

4. The turbine vane of claim 3 wherein said stacking line is shaped in an arc.

5. The turbine vane of claim 4 wherein said turbine vane is also leaned in said first direction.

6. The turbine vane of claim 4 including an turbine vane midspan wherein said stacking line shaped in an arc is defined by a radius having an origin located on a line perpendicular to the tangent of said arc at said airfoil midspan.

7. A turbine vane assembly comprising an inner shroud, an outer shroud, and a turbine vane mounted between said shrouds, said vane including a pressure side and a suction side, wherein said vane is curved circumferentially outward in a first direction, said first direction is the direction which said suction side faces.

8. A turbine vane assembly comprising an inner shroud, an outer shroud, and a turbine vane mounted between said shrouds, said vane including a pressure side, a suction side, and a stacking line, wherein said stacking line is curved circumferentially outward in said first direction.

9. The turbine vane assembly of claim 8 wherein said stacking line is arc shaped.

10. The turbine vane assembly of claim 9 wherein said airfoil is also leaned in said first direction.

* * * * *